United States Patent
Cai et al.

(10) Patent No.: US 9,484,989 B2
(45) Date of Patent: *Nov. 1, 2016

(54) SYSTEM AND METHOD FOR AUTONOMOUS COMBINING

(75) Inventors: Zhijun Cai, Euless, TX (US); James Earl Womack, Bedford, TX (US); Yi Yu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 119 days.

This patent is subject to a terminal disclaimer.

(21) Appl. No.: 12/916,214

(22) Filed: Oct. 29, 2010

(65) Prior Publication Data
US 2011/0044234 A1 Feb. 24, 2011

Related U.S. Application Data

(62) Division of application No. 12/337,214, filed on Dec. 17, 2008, now Pat. No. 8,040,904.

(51) Int. Cl.
*H04B 7/02* (2006.01)

(52) U.S. Cl.
CPC ............. *H04B 7/022* (2013.01); *H04B 7/026* (2013.01)

(58) Field of Classification Search
USPC ........ 370/401, 476, 338, 474, 475, 501, 315
See application file for complete search history.

(56) References Cited

U.S. PATENT DOCUMENTS

| | | | |
|---|---|---|---|
| 6,014,375 A | 1/2000 | Janky | |
| 6,512,745 B1 | 1/2003 | Abe et al. | |
| 6,690,657 B1 | 2/2004 | Lau et al. | |
| 6,785,510 B2 | 8/2004 | Larsen | |
| 7,054,633 B2 | 5/2006 | Seo et al. | |
| 7,061,879 B2 | 6/2006 | Oprescu-Surcobe et al. | |
| 7,130,614 B2 | 10/2006 | Sreemanthula et al. | |
| 7,227,851 B1 | 6/2007 | Gopalakrishnan et al. | |
| 7,349,665 B1 | 3/2008 | Zhu et al. | |
| 7,386,036 B2 | 6/2008 | Pasanen et al. | |
| 7,564,827 B2 | 7/2009 | Das et al. | |
| 7,577,124 B2 * | 8/2009 | Yomo et al. | 370/338 |
| 7,602,843 B2 | 10/2009 | Cho et al. | |
| 7,673,211 B2 | 3/2010 | Meyer et al. | |
| 7,706,408 B2 | 4/2010 | Takagi et al. | |
| 7,724,767 B2 | 5/2010 | Oksman | |
| 7,742,448 B2 | 6/2010 | Ramachandran et al. | |

(Continued)

FOREIGN PATENT DOCUMENTS

| | | |
|---|---|---|
| CN | 1941666 A | 4/2007 |
| CN | 1960352 A | 5/2007 |

(Continued)

OTHER PUBLICATIONS

Cai, Zhijun, et al.; U.S. Appl. No. 13/221,584, filed Aug. 30, 2011; Title: System and Method for Autonomous Combining.

(Continued)

*Primary Examiner* — Gary Mui
(74) *Attorney, Agent, or Firm* — Conley Rose, P.C.; J. Robert Brown, Jr.

(57) ABSTRACT

A user agent capable of carrying out autonomous combining. The user agent can be implemented as a processor configured to promote receiving a first signal from an access node and a second signal from a relay node. The processor may be further configured to combine the first and second signals.

15 Claims, 5 Drawing Sheets

(56) References Cited

U.S. PATENT DOCUMENTS

| | | |
|---|---|---|
| 7,830,837 B2 | 11/2010 | Park et al. |
| 7,873,002 B2 | 1/2011 | Cai |
| 7,898,948 B2 | 3/2011 | DiGirolamo et al. |
| 8,072,918 B2 | 12/2011 | Muharemovic et al. |
| 8,121,552 B2 | 2/2012 | Agami et al. |
| 8,175,014 B2 | 5/2012 | Terry et al. |
| 8,228,851 B2 | 7/2012 | Wu |
| 8,234,534 B2 | 7/2012 | Park et al. |
| 8,265,016 B2 | 9/2012 | Xu |
| 8,281,211 B2 | 10/2012 | Wang et al. |
| 8,391,202 B2 | 3/2013 | Courseille |
| 8,428,016 B2 | 4/2013 | Bhattad et al. |
| 8,576,882 B2 | 11/2013 | Zhang et al. |
| 8,605,674 B2 | 12/2013 | Park et al. |
| 2002/0032032 A1 | 3/2002 | Haumont et al. |
| 2002/0155839 A1 | 10/2002 | Nisbet |
| 2002/0187746 A1 | 12/2002 | Cheng et al. |
| 2003/0096631 A1 | 5/2003 | Kayama et al. |
| 2003/0101274 A1 | 5/2003 | Yi et al. |
| 2003/0103480 A1* | 6/2003 | You et al. ............... 370/335 |
| 2004/0042492 A1 | 3/2004 | Suzuki et al. |
| 2004/0063451 A1 | 4/2004 | Bonta et al. |
| 2004/0266339 A1 | 12/2004 | Larsson |
| 2005/0014464 A1 | 1/2005 | Larsson |
| 2005/0037798 A1 | 2/2005 | Yamashita et al. |
| 2005/0042987 A1 | 2/2005 | Lee et al. |
| 2005/0148311 A1 | 7/2005 | Anderson |
| 2005/0232212 A1 | 10/2005 | Kang et al. |
| 2006/0183421 A1 | 8/2006 | Proctor, Jr. et al. |
| 2006/0239455 A1 | 10/2006 | Kato |
| 2007/0002766 A1 | 1/2007 | Park et al. |
| 2007/0058661 A1 | 3/2007 | Chow |
| 2007/0070953 A1 | 3/2007 | Yoon et al. |
| 2007/0081483 A1 | 4/2007 | Jang et al. |
| 2007/0082621 A1 | 4/2007 | Lee et al. |
| 2007/0097945 A1 | 5/2007 | Wang et al. |
| 2007/0104148 A1 | 5/2007 | Kang et al. |
| 2007/0153734 A1 | 7/2007 | Lee et al. |
| 2007/0155315 A1 | 7/2007 | Lee et al. |
| 2007/0171925 A1 | 7/2007 | Tanimoto |
| 2007/0206531 A1 | 9/2007 | Pajukoski et al. |
| 2007/0230605 A1 | 10/2007 | Osseiran et al. |
| 2007/0253421 A1 | 11/2007 | Cai |
| 2007/0274250 A1 | 11/2007 | Chen et al. |
| 2007/0287476 A1 | 12/2007 | Jeong et al. |
| 2007/0291696 A1 | 12/2007 | Zhang et al. |
| 2008/0002610 A1 | 1/2008 | Zheng et al. |
| 2008/0025248 A1 | 1/2008 | Naden |
| 2008/0025323 A1 | 1/2008 | Khan |
| 2008/0043671 A1 | 2/2008 | Moon et al. |
| 2008/0043710 A1 | 2/2008 | Zhou et al. |
| 2008/0056173 A1 | 3/2008 | Watanabe |
| 2008/0081628 A1 | 4/2008 | Ye et al. |
| 2008/0089282 A1 | 4/2008 | Malladi et al. |
| 2008/0101306 A1 | 5/2008 | Bertrand et al. |
| 2008/0101498 A1 | 5/2008 | Han et al. |
| 2008/0102794 A1 | 5/2008 | Keevill et al. |
| 2008/0107072 A1 | 5/2008 | Viorel et al. |
| 2008/0107076 A1 | 5/2008 | Ramachandran et al. |
| 2008/0107078 A1 | 5/2008 | Viorel et al. |
| 2008/0108303 A1 | 5/2008 | Okuda |
| 2008/0108304 A1 | 5/2008 | Suga |
| 2008/0159337 A1 | 7/2008 | Lee |
| 2008/0165776 A1 | 7/2008 | Tao et al. |
| 2008/0174470 A1 | 7/2008 | Lum et al. |
| 2008/0212513 A1 | 9/2008 | Tao et al. |
| 2008/0225765 A1 | 9/2008 | Marinier et al. |
| 2008/0225772 A1 | 9/2008 | Xu |
| 2008/0227449 A1 | 9/2008 | Gholmieh et al. |
| 2008/0227461 A1 | 9/2008 | Dayal et al. |
| 2008/0232284 A1 | 9/2008 | Dalsgaard et al. |
| 2008/0232493 A1 | 9/2008 | Zhang et al. |
| 2008/0247375 A1 | 10/2008 | Muharemovic et al. |
| 2008/0285500 A1 | 11/2008 | Zhang et al. |
| 2008/0285501 A1 | 11/2008 | Zhang et al. |
| 2008/0293358 A1 | 11/2008 | Andersson et al. |
| 2008/0310389 A1 | 12/2008 | Suzuki et al. |
| 2008/0311904 A1 | 12/2008 | Courseille |
| 2009/0010199 A1* | 1/2009 | Adachi et al. ............... 370/315 |
| 2009/0046641 A1 | 2/2009 | Wang et al. |
| 2009/0061892 A1 | 3/2009 | Lee et al. |
| 2009/0061920 A1 | 3/2009 | Horiuchi et al. |
| 2009/0111476 A1 | 4/2009 | Hamalainen et al. |
| 2009/0116423 A1* | 5/2009 | Ni et al. ............... 370/315 |
| 2009/0154533 A1 | 6/2009 | Khayrallah et al. |
| 2009/0190522 A1 | 7/2009 | Horn et al. |
| 2009/0191882 A1 | 7/2009 | Kovacs et al. |
| 2009/0196177 A1 | 8/2009 | Teyeb et al. |
| 2009/0196332 A1 | 8/2009 | Miyatani |
| 2009/0239568 A1 | 9/2009 | Bertrand et al. |
| 2009/0252079 A1 | 10/2009 | Zhang et al. |
| 2009/0252088 A1 | 10/2009 | Rao et al. |
| 2009/0264077 A1 | 10/2009 | Damnjanovic |
| 2009/0276672 A1 | 11/2009 | Lee et al. |
| 2009/0291679 A1 | 11/2009 | Wu |
| 2009/0303918 A1 | 12/2009 | Ma et al. |
| 2009/0313518 A1 | 12/2009 | Shen et al. |
| 2009/0325480 A1* | 12/2009 | Ji et al. ............... 455/8 |
| 2009/0325618 A1 | 12/2009 | Aiba et al. |
| 2010/0003977 A1 | 1/2010 | Pinheiro et al. |
| 2010/0005351 A1 | 1/2010 | Ahn et al. |
| 2010/0027457 A1 | 2/2010 | Okuda |
| 2010/0027458 A1 | 2/2010 | Wu et al. |
| 2010/0039947 A1 | 2/2010 | Li et al. |
| 2010/0046413 A1 | 2/2010 | Jin et al. |
| 2010/0046418 A1* | 2/2010 | Horn et al. ............... 370/315 |
| 2010/0056197 A1 | 3/2010 | Attar et al. |
| 2010/0061361 A1 | 3/2010 | Wu |
| 2010/0074209 A1 | 3/2010 | Montojo et al. |
| 2010/0080166 A1 | 4/2010 | Palanki et al. |
| 2010/0091759 A1 | 4/2010 | Stahl et al. |
| 2010/0098045 A1 | 4/2010 | Miyazaki |
| 2010/0103845 A1 | 4/2010 | Ulupinar et al. |
| 2010/0110967 A1 | 5/2010 | Sartori et al. |
| 2010/0120442 A1 | 5/2010 | Zhuang et al. |
| 2010/0131814 A1 | 5/2010 | Chiu |
| 2010/0135231 A1 | 6/2010 | Harada et al. |
| 2010/0135251 A1 | 6/2010 | Sambhwani et al. |
| 2010/0142433 A1 | 6/2010 | Womack et al. |
| 2010/0182992 A1 | 7/2010 | Chun et al. |
| 2010/0184434 A1 | 7/2010 | Jeong et al. |
| 2010/0202307 A1 | 8/2010 | Lee et al. |
| 2010/0271999 A1 | 10/2010 | Yu et al. |
| 2010/0296431 A1 | 11/2010 | Terry et al. |
| 2010/0297993 A1 | 11/2010 | Heo et al. |
| 2010/0302998 A1 | 12/2010 | Bao et al. |
| 2010/0322145 A1 | 12/2010 | Yu et al. |
| 2010/0322194 A1 | 12/2010 | Hu et al. |
| 2010/0323612 A1 | 12/2010 | Xu et al. |
| 2010/0323614 A1 | 12/2010 | Yu et al. |
| 2010/0323684 A1 | 12/2010 | Cai et al. |
| 2010/0325506 A1 | 12/2010 | Cai et al. |
| 2011/0026409 A1 | 2/2011 | Hu et al. |
| 2011/0041027 A1 | 2/2011 | Fong et al. |
| 2011/0092212 A1 | 4/2011 | Kubota |
| 2011/0110258 A1 | 5/2011 | Ishii et al. |
| 2011/0261763 A1 | 10/2011 | Chun et al. |
| 2011/0317648 A1 | 12/2011 | Lee et al. |
| 2012/0057560 A1 | 3/2012 | Park et al. |
| 2013/0094431 A1 | 4/2013 | Terry et al. |
| 2015/0163821 A1 | 6/2015 | Wu |

FOREIGN PATENT DOCUMENTS

| | | |
|---|---|---|
| CN | 101047431 A | 10/2007 |
| CN | 101141171 A | 3/2008 |
| CN | 101217337 A | 7/2008 |
| CN | 101222299 A | 7/2008 |
| CN | 101257492 A | 9/2008 |
| CN | 101296060 A | 10/2008 |
| EP | 1534035 A1 | 5/2005 |
| EP | 1773091 A2 | 4/2007 |
| EP | 1775983 A1 | 4/2007 |
| EP | 1883178 A2 | 1/2008 |

(56) References Cited

FOREIGN PATENT DOCUMENTS

| | | |
|---|---|---|
| EP | 1890402 A2 | 2/2008 |
| EP | 1919234 A2 | 5/2008 |
| EP | 1924009 A1 | 5/2008 |
| EP | 1940185 A1 | 7/2008 |
| EP | 1959708 A1 | 8/2008 |
| EP | 1995921 A2 | 11/2008 |
| EP | 2242306 A1 | 10/2010 |
| JP | 2004328665 A | 11/2004 |
| JP | 2006311253 A | 11/2006 |
| JP | 2007312244 A | 11/2007 |
| JP | 2008034335 A | 2/2008 |
| JP | 2008060951 A | 3/2008 |
| JP | 2008511210 A | 4/2008 |
| JP | 2008104096 A | 5/2008 |
| JP | 2008118499 A | 5/2008 |
| JP | 2008118500 A | 5/2008 |
| JP | 2008118651 A | 5/2008 |
| JP | 2008118652 A | 5/2008 |
| JP | 2008131649 A | 6/2008 |
| JP | 2008167141 A | 7/2008 |
| JP | 2008172754 A | 7/2008 |
| JP | 2008172759 A | 7/2008 |
| JP | 2008537379 A | 9/2008 |
| JP | 2008271270 A | 11/2008 |
| JP | 2009520435 A | 5/2009 |
| JP | 2009521891 A | 6/2009 |
| JP | 2009524323 A | 6/2009 |
| JP | 2009182944 A | 8/2009 |
| JP | 2009188926 A | 8/2009 |
| JP | 2009531898 A | 9/2009 |
| JP | 2009539299 A | 11/2009 |
| JP | 2010504665 A | 2/2010 |
| JP | 2010506447 A | 2/2010 |
| JP | 2010103638 A | 5/2010 |
| JP | 2010136337 A | 6/2010 |
| WO | 0137590 A1 | 5/2001 |
| WO | 2005064872 A1 | 7/2005 |
| WO | 2006024321 A1 | 3/2006 |
| WO | 2007048247 A1 | 5/2007 |
| WO | 2007053950 A1 | 5/2007 |
| WO | 2007053954 A1 | 5/2007 |
| WO | 2007060731 A1 | 5/2007 |
| WO | 2007064249 A1 | 6/2007 |
| WO | 2007073121 A1 | 6/2007 |
| WO | 2007078142 A1 | 7/2007 |
| WO | 2007083230 A2 | 7/2007 |
| WO | 2007110447 A1 | 10/2007 |
| WO | 2007131347 A1 | 11/2007 |
| WO | 2008004806 A1 | 1/2008 |
| WO | 2008009228 A1 | 1/2008 |
| WO | 2008022132 A2 | 2/2008 |
| WO | 2008034335 A1 | 3/2008 |
| WO | 2008040930 A1 | 4/2008 |
| WO | 2008047870 A1 | 4/2008 |
| WO | 2008050961 A1 | 5/2008 |
| WO | 2008078365 A1 | 7/2008 |
| WO | 2008084949 A1 | 7/2008 |
| WO | 2008103981 A2 | 8/2008 |
| WO | 2008109912 A1 | 9/2008 |
| WO | 2008115826 A1 | 9/2008 |
| WO | 2008133307 A1 | 11/2008 |
| WO | 2008149979 A1 | 12/2008 |
| WO | 2009017005 A1 | 2/2009 |
| WO | 2009088172 A2 | 7/2009 |
| WO | 2009154038 A1 | 12/2009 |
| WO | 2010002100 A2 | 1/2010 |

OTHER PUBLICATIONS

Office Action dated Aug. 19, 2011; U.S. Appl. No. 12/331,992, filed Dec. 10, 2008; 52 pgs.
Office Action dated Jul. 21, 2011; U.S. Appl. No. 12/340,418, filed Dec. 19, 2008; 34 pgs.
Office Action dated Jun. 16, 2011; U.S. Appl. No. 12/340,412, filed Dec. 19, 2008; 33 pgs.
Office Action dated Jul. 13, 2011; U.S. Appl. No. 12/337,207, filed Dec. 17, 2008; 34 pgs.
Office Action dated Jul. 22, 2011; U.S. Appl. No. 12/337,235, filed Dec. 17, 2008; 36 pgs.
Notice of Allowance dated May 27, 2011; U.S. Appl. No. 12/337,214, filed Dec. 17, 2008; 10 pgs.
Office Action dated Jul. 18, 2011; U.S. Appl. No. 12/340,432, filed Dec. 19, 2008; 6 pgs.
Office Action dated Jun. 1, 2011; U.S. Appl. No. 12/337,222, filed Dec. 17, 2008; 2 pgs.
PCT International Preliminary Report on Patentability; PCT Application No. PCT/US2009/030967; Jun. 14, 2011; 11 pgs.
Australian Examination Report; Application No. 2009325082; Jul. 11, 2011; 2 pgs.
PCT International Preliminary Report on Patentability; PCT Application No. PCT/US2009/062551; Jun. 21, 2011; 6 pgs.
PCT International Preliminary Report on Patentability; PCT Application No. PCT/US2009/062554; Jun. 21, 2011; 8 pgs.
PCT International Preliminary Report on Patentability; PCT Application No. PCT/US2009/062557; Jun. 21, 2011; 7 pgs.
PCT International Preliminary Report on Patentability; PCT Application No. PCT/US2009/062560; Jun. 21, 2011; 8 pgs.
PCT International Preliminary Report on Patentability; PCT Application No. PCT/US2009/062570; Jun. 21, 2011; 9 pgs.
PCT International Preliminary Report on Patentability; PCT Application No. PCT/US2009/062574; Jun. 21, 2011; 10 pgs.
PCT International Preliminary Report on Patentability; PCT Application No. PCT/US2009/064398; Jun. 21, 2011; 10 pgs.
Office Action dated Sep. 16, 2011; U.S. Appl. No. 12/340,432, filed Dec. 19, 2008; 33 pgs.
Cai, Zhijun, et al.; U.S. Appl. No. 13/221,583, filed Aug. 30, 2011; Title: System and Method for Autonomous Combining.
Office Action dated Mar. 21, 2012; U.S. Appl. No. 12/337,229, filed Dec. 17, 2008; 49 pages.
Notice of Allowance dated Jun. 12, 2012; U.S. Appl. No. 12/337,207, filed Dec. 17, 2008; 20 pages.
Advisory Action dated Mar. 22, 2012; U.S. Appl. No. 12/337,235, filed Dec. 17, 2008; 10 pages.
Final Office Action dated Mar. 23, 2012; U.S. Appl. No. 12/340,432, filed Dec. 19, 2008; 28 pgs.
Final Office Action dated Apr. 19, 2012; U.S. Appl. No. 13/216,819, filed Aug. 25, 2011; 39 pgs.
Final Office Action dated Jun. 7, 2012; U.S. Appl. No. 12/337,222, filed Dec. 17, 2008; 16 pgs.
Australian Examination Report; Application No. 2009325082; Mar. 28, 2012; 3 pages.
European Examination Report; Application No. 09748915.7; May 14, 2012; 3 pages.
European Examination Report; Application No. 09761065.3; May 7, 2012; 4 pages.
Rohde & Schwarz; "UMTS Long Term Evolution (LTE) Technology Introduction;" Application Note 1MA111; Sep. 2008; 55 pages.
Yu, Yi, et al.; U.S. Appl. No. 13/216,819, filed Aug. 24, 2011; Title: Multiple-Input Multiple-Output (MIMO) with Relay Nodes.
Final Office Action dated Dec. 9, 2011; U.S. Appl. No. 12/331,992, filed Dec. 10, 2008; 24 pgs.
Office Action dated Nov. 8, 2011; U.S. Appl. No. 12/340,412, filed Dec. 19, 2008; 19 pgs.
Office Action dated Nov. 10, 2011; U.S. Appl. No. 13/216,819, filed Aug. 25, 2011; 19 pgs.
Final Office Action dated Jan. 5, 2012; U.S. Appl. No. 12/340,418, filed Dec. 19, 2008; 22 pgs.
Office Action dated Feb. 17, 2012; U.S. Appl. No. 12/340,412, filed Dec. 19, 2008; 19 pgs.
Final Office Action dated Dec. 16, 2011; U.S. Appl. No. 12/337,207, filed Dec. 17, 2008; 37 pgs.
Advisory Action dated Mar. 2, 2012; U.S. Appl. No. 12/337,207, filed Dec. 17, 2008; 3 pages.
Final Office Action dated Jan. 9, 2012; U.S. Appl. No. 12/337,235, filed Dec. 17, 2008; 26 pgs.

(56) References Cited

OTHER PUBLICATIONS

Office Action dated Feb. 1, 2012; U.S. Appl. No. 12/337,222, filed Dec. 17, 2008; 20 pgs.
Australian Office Action; Application No. 2009333788; Dec. 8, 2011; 3 pages.
PCT International Preliminary Report on Patentability; PCT Application No. PCT/US2009/062571; Mar. 10, 2011; 8 pgs.
Office Action dated Jan. 25, 2011, 39 pages, U.S. Appl. No. 12/337,207, filed Dec. 17, 2008.
Notice of Allowance dated Mar. 25, 2011, 11 pages, U.S. Appl. No. 12/337,214, filed Dec. 17, 2008.
Womack, James Earl, et al.; U.S. Appl. No. 12/331,992, filed Dec. 10, 2008; Title: Method and Apparatus for Discovery of Relay Nodes.
Womack, James Earl, et al.; U.S. Appl. No. 12/340,418, filed Dec. 19, 29008; Title: System and Method for Relay Nod Selection.
Yu, Yi, et al.; U.S. Appl. No. 12/337,229, filed Dec. 17, 2008; Title: System and Method for Hybrid Automatic Repeat Request (HARQ) Functionality in a Relay Node.
Cai, Zhijun, et al.; U.S. Appl. No. 12/340,412, filed Dec. 19, 2008; Title: System and Method for Resource Allocation.
Yu, Yi, et al.; U.S. Appl. No. 12/337,207, filed Dec. 17, 2008; Title: System and Method for Multi-User Multiplexing.
Womack, James Earl, et al.; U.S. Appl. No. 12/337,235, filed Dec. 17, 2008; Title: System and Method for Initial Access to Relays.
Cai, Zhijun, et al.; U.S. Appl. No. 12/337,214, filed Dec. 17, 2008; Title: System and Method for Autonomous Combining.
Yu, Yi, et al.; U.S. Appl. No. 12/340,432, filed Dec. 19, 2008; Title: Multiple-Input Multiple-Output (MIMO) with Relay Nodes.
Cai, Zhijun, et al.; U.S. Appl. No. 12/337,222, filed Dec. 17, 2008; Title: System and Method for a Relay Protocol Stack.
Office Action dated Jul. 12, 2010, 40 pages, U.S. Appl. No. 12/337,207, filed Dec. 17, 2008.
Office Action dated May 26, 2010, 9 pages, U.S. Appl. No. 12/337,214, filed Dec. 17, 2008.
Notice of Allowance dated Nov. 8, 2010, 10 pages, U.S. Appl. No. 12/337,214, filed Dec. 17, 2008.
Office Action dated Aug. 17, 2010, 25 pages, U.S. Appl. No. 12/337,222, filed Dec. 17, 2008.
PCT International Search Report; PCT Application No. PCT/US2009/030967; Sep. 8, 2009; 5 pgs.
PCT Written Opinion of the International Searching Authority; PCT Application No. PCT/US2009/030967; Sep. 8, 2009; 9 pgs.
PCT International Search Report; PCT Application No. PCT/US2009/062551; Jan. 28, 2010; 4 pgs.
PCT Written Opinion of the International Searching Authority; PCT Application No. PCT/US2009/062551; Jan. 28, 2010; 5 pgs.
PCT Communication Relating to the Results of the Partial International Search; PCT Application No. PCT/US2009/062554; Mar. 2, 2010; 6 pgs.
PCT International Search Report; PCT Application No. PCT/US2009/062554; May 12, 2010; 6 pgs.
PCT Written Opinion of the International Searching Authority; PCT Application No. PCT/US2009/062554; May 12, 2010; 7 pgs.
PCT International Search Report; PCT Application No. PCT/US2009/062557; Feb. 10, 2010; 4 pgs.
PCT Written Opinion of the International Searching Authority; PCT Application No. PCT/US2009/062557; Feb. 10, 2010; 7 pgs.
PCT International Search Report; PCT Application No. PCT/US2009/062560; Mar. 1, 2010; 4 pgs.
PCT Written Opinion of the International Searching Authority; PCT Application No. PCT/US2009/062560; Mar. 1, 2010; 7 pgs.
PCT International Search Report; PCT Application No. PCT/US2009/062570; Feb. 22, 2010; 4 pgs.
PCT Written Opinion of the International Searching Authority; PCT Application No. PCT/US2009/062570; Feb. 22, 2010; 8 pgs.
PCT Communication Relating to the Results of the Partial International Search; PCT Application No. PCT/US2009/062571; Feb. 12, 2010; 6 pgs.
PCT International Search Report; PCT Application No. PCT/US2009/062571; Apr. 19, 2010; 6 pgs.
PCT Written Opinion of the International Searching Authority; PCT Application No. PCT/US2009/062571; Apr. 19, 2010; 6 pgs.
PCT Communication Invitation to Pay Additional Fees and, Where Applicable, Protest Fee; PCT Application No. PCT/US2009/062574; Apr. 22, 2010; 8 pgs.
PCT International Search Report; PCT Application No. PCT/US2009/062574; Jul. 19, 2010; 6 pgs.
PCT Written Opinion of the International Searching Authority; PCT Application No. PCT/US2009/062574; Jul. 19, 2010; 9 pgs.
PCT International Search Report; PCT Application No. PCT/US2009/064398; Mar. 18, 2010; 5 pgs.
PCT Written Opinion of the International Searching Authority; PCT Application No. PCT/US2009/064398; Mar. 18, 2010; 9 pgs.
Final Office Action dated Jan. 14, 2011, 16 pages, U.S. Appl. No. 12/337,222, filed Dec. 17, 2008.
3GPP TR 36.814v0.4.1; 3rd Generation Partnership Project; Technical Specification Group Radio Access Network; Further Advancements for E-UTRA Physical Layer Aspects; Release 9; Feb. 2009; 31 pgs.
3GPP TR 36.913 v1.0.0; 3rd Generation Partnership Project; Technical Specification Group Radio Access Network; Requirements for Further Advancements for E-UTRA (LTE-Advanced) Release 8; May 2008; 13 pgs.
3GPP TS 36.212 v8.4.0; 3rd Generation Partnership Project; Technical Specification Group Radio Access Network; Evolved Universal Terrestrial Radio Access (E-UTRA); Multiplexing and Channel Coding; Release 8; Sep. 2008; 56 pgs.
3GPP TS 36.304 v8.3.0; 3rd Generation Partnership Project; Technical Specification Group Radio Access Network; Evolved Universal Terrestrial Radio Access (E-UTRA); User Equipment (UE) Procedures in Idle Mode; Release 8; 28 pgs.
3GPP TS 36.321 v8.3.0; 3rd Generation Partnership Project; Technical Specification Group Radio Access Network; Evolved Universal Terrestrial Radio Access (E-UTRA) Medium Access Control (MAC) Protocol Specification; Release 8; Sep., 2008; 36 pgs.
3GPP TS 36.321 v8.1.0; 3rd Generation Partnership Project; Technical Specification Group Radio Access Network; Evolved Universal Terrestrial Radio Access (E-UTRA) Medium Access Control (MAC) Protocol Specification; Release 8; Mar. 2008; 30 pgs.
Parkvall, Stefan, et al., The Evolution of WCDMA Towards Higher Speed Downlink Packet Data Access, XP-001082550, IEEE VTC, 2001, pp. 2287-2291.
3GPP TS 36.331 v8.3.0; 3rd Generation Partnership Project; Technical Specification Group Radio Access Network; Evolved Universal Terrestrial Radio Access (E-UTRA) Radio Resource Control (RRC); Protocol Specification; Release 8; Sep. 2008; 178 pgs.
China Mobile, Vodafone, Huawei; TSG-RAN WG1 #54; Title: Application Scenarios for LTE-Advanced Relay; R1-082975; Jeju, Korea; Aug. 18-22, 2008; 7 pgs.
Doppler, Klaus, et al., Assesment of Relay Based Deployment Concepts and Detailed Description of Multi-hop Capable RAN Protocols as Input for the Concept Group Work; IST-4-027756 Winner II; D3.5.2 v1.0; XP-002526747; 24 pages.
Ericsson; TSG-RAN WG1 #53; Title: A Discussion on Some Technology Components for LTE-Advanced; R1-082024; Kansas City, Missouri; May 5-9, 2008; 11 pgs.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 101 pgs.; Part 2.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 117 pgs.; Part 1.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 96 pgs.; Part 3.
Mitsubishi Electric; 3GPP TSG RAN WG1 #54 Meeting; Title: Basic Structure of Relaying under Multi-Antenna eNB; R1-082775; Jeju Island, Korea; Aug. 18-22, 2008; 4 pgs.

(56) References Cited

OTHER PUBLICATIONS

Motorola; Title: Classification of Relays; TSG-RAN WG1 #54; R1-083223; Jeju, South Korea; Aug. 18-22, 2008; 3 pgs.
Pabst, Ralf et al.; Title: Relay-Based Deployment Concepts for Wireless and Mobile Broadband Radio; IEEE Communications Magazine; Sep. 2004; pp. 80-89.
Panasonic; 3GPP TSG RAN WG1 Meeting #54; Title: Discussion on the Various Types of Relays; R1-082397; Warsaw, Poland; Jun. 30-Jul. 4, 2008; 6 pgs.
Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pgs.
Qualcomm Europe; 3GPP TSG-RAN WG1 #54; Title: Operation of Relays in LTE-A; R1-083191; Jeju, S. Korea; Aug. 18-22, 2008; 5 pgs.
Research in Motion, Limited; 3GPP TSG RAN WG1 Meeting #55; Title: L2 Relay Interference Mitigation; R1-084102; Prague, Czech Republic; Nov. 10-14, 2008; 6 pgs.
Research in Motion, Limited; 3GPP TSG RAN WG1 Meeting #55-bis; Title: Relay Control Signalling Resource Coordination; R1-090027; Ljubljana, Slovenia; Jan. 12-16, 2009; 3 pgs.
Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pgs.
Soldani, David, et al.; Title: Wireless Relays for Broadband Access; IEEE Communications Magazine; Mar. 2008. pp. 58-66.
Texas Instruments; 3GPP TSG RAN WG1 #54bis; Title: Decod and Forward Relays for E-UTRA Enhancements; R1-083533; Prague, Czech Republic; Sep. 29-Oct. 3, 2008; 5 pgs.
Office Action dated Oct. 2, 2012; U.S. Appl. No. 12/340,418, filed Dec. 19, 2008; 29 pgs.
Office Action dated Oct. 12, 2012; U.S. Appl. No. 13/548,807, filed Jul. 13, 2012; 53 pages.
Korean Office Action; Application No. 10-2011-7015882; Sep. 18, 2012; 10 pages.
Yu, Yi, et al.; U.S. Appl. No. 13/548,817, filed Jul. 13, 2012; Title: System and Method for Multi-User Multiplexing.
Notice of Allowance dated Aug. 28, 2012; U.S. Appl. No. 12/337,229, filed Dec. 17, 2008; 6 pages.
Notice of Allowance dated Aug. 10, 2012; U.S. Appl. No. 12/340,412, filed Dec. 19, 2008; 17 pgs.
Notice of Allowance dated Sep. 11, 2012; U.S. Appl. No. 12/337,235, filed Dec. 17, 2008; 16 pages.
Notice of Allowance dated Jun. 20, 2012; U.S. Appl. No. 12/340,432, filed Dec. 19, 2008; 23 pages.
Korean Office Action; Application No. 10-2011-7016626; Jul. 17, 2012; 7pages.
European Examination Report; Application No. 09756080.9; Jun. 15, 2012; 5 pages.
Cai, Zhijun, et al.; U.S. Appl. No. 13/716,839, filed Dec. 17, 2012; Title: System and Method for Resource Allocation.
Notice of Allowance dated Jan. 17, 2013; U.S. Appl. No. 12/340,418, filed Dec. 19, 2008; 25 pgs.
Final Office Action dated Jan. 24, 2013; U.S. Appl. No. 13/548,807, filed Jul. 13, 2012; 33 pages.
Office Action dated Jan. 31, 2013; U.S. Appl. No. 13/221,583, filed Aug. 30, 2011; 69 pgs.
Office Action dated Feb. 5, 2013; U.S. Appl. No. 13/221,584, filed Aug. 30, 2011; 65 pages.
Japanese Office Action; Application No. 2011-542163; Dec. 18, 2012; 7 pages.
3GPP TSG RAN WG3 Meeting #57; "Correction of Synchronization, Handover, Trace, eMBMS Architecture, and S1 Common Functions and Procedures"; R3-071695/R2-073880; Athens, Greece; Aug. 20-24, 2007; 108 pages.
3GPP TSG-RAN-WG1 Meeting #54bis; "Further Details and Considerations of Different Types of Relays"; R1-083712; Prague, Czech Republic; Sep. 29-Oct. 3, 2008; 6 pages.
Sendonaris, Andrew, et al.; "User Cooperation Diversity—Part I: System Description"; IEEE Transactions on Communications; vol. 51, No. 11; Nov. 2003; 12 pages.
Sendonaris, Andrew, et al.; "User Cooperation Diversity—Part II: Implementation Aspects and Performance Analysis"; IEEE Transactions on Communications; vol. 51, No. 11; Nov. 2003; 10 pages.
Office Action dated Dec. 3, 2012; U.S. Appl. No. 12/337,222, filed Dec. 17, 2008; 24 pgs.
Japanese Office Action; Application No. 2011-540716; Oct. 4, 2012; 15 pages.
Japanese Office Action; Application No. 2011-542161; Nov. 1, 2012; 17 pages.
Korean Office Action; Application No. 10-2011-7016626; Oct. 26, 2012; 8pages.
Japanese Office Action; Application No. 2011-542162; Oct. 17, 2012; 10 pages.
Japanese Office Action; Application No. 2011-542164; Oct. 26, 2012; 7 pages.
Japanese Office Action; Application No. 2011-542165; Oct. 26, 2012; 7 pages.
Korean Office Action; Application No. 10-2011-7016425; Oct. 30, 2012; 9 pages.
Japanese Office Action; Application No. 2011-542177; Oct. 26, 2012; 10 pages.
Yu, Yi, et al.; U.S. Appl. No. 13/842,584, filed Mar. 15, 2013; Title: System and Method for Hybrid Automatic Repeat Request (HARQ) Functionality in a Relay Node.
Womack, James Earl, et al.; U.S. Appl. No. 13/864,810, filed Apr. 18, 2013; Title: System and Method for Relay Node Selection.
Advisory Action dated Apr. 12, 2013; U.S. Appl. No. 13/548,817, filed Jul. 13, 2012; 8 pages.
Office Action dated Apr. 18, 2013; U.S. Appl. No. 13/216,819, filed Aug. 25, 2011; 37 pgs.
Office Action dated May 29, 2013; U.S. Appl. No. 12/337,222, filed Dec. 17, 2008; 26 pgs.
Office Action dated May 10, 2013; U.S. Appl. No. 13/221,583, filed Aug. 30, 2011; 21 pgs.
Final Office Action dated May 14, 2013; U.S. Appl. No. 13/221,584, filed Aug. 30, 2011; 15 pages.
Canadian Office Action; Application No. 2,746,635; Apr. 18, 2013; 3 pages.
Korean Office Action; Application No. 10-2011-7015882; Mar. 21, 2013; 7 pages.
Canadian Office Action; Application No. 2,747,593; May 24, 2013; 3 pages.
Canadian Office Action; Application No. 2,747,339; May 1, 2013; 2 pages.
Korean Office Action; Application No. 10-2011-7016626; May 20, 2013; 5 pages.
Canadian Office Action; Application No. 2,747,625; May 3, 2013; 3 pages.
European Examination Report; Application No. 09761065.3; May 16, 2013; 3 pages.
Canadian Office Action; Application No. 2,747,343; May 24, 2013; 3 pages.
Canadian Office Action; Application No. 2,750,828; Apr. 4, 2013; 4 pages.
Japanese Office Action; Application No. 2011-542177; Apr. 26, 2013; 12 pages.
Notice of Allowance dated Nov. 25, 2013; U.S. Appl. No. 13/216,819, filed Aug. 24, 2011; 16 pages.
Final Office Action dated Nov. 20, 2013; U.S. Appl. No. 12/337,222, filed Dec. 17, 2008; 28 pgs.
Advisory Action dated Dec. 6, 2013; U.S. Appl. No. 13/221,583, filed Aug. 30, 2011; 3 pages.
Office Action dated Dec. 20, 2013; U.S. Appl. No. 13/865,810, filed Apr. 18, 2013. 72 pages.
Chinese Office Action; Application No. 200980156892.1; Dec. 31, 2013; 16 pages.
Japanese Office Action; Application No. 2011-542165; Nov. 6, 2013; 5 pages.
Office Action dated Feb. 14, 2014; U.S. Appl. No. 12/331,992, filed Dec. 10, 2008; 81 pages.

(56) References Cited

OTHER PUBLICATIONS

Office Action dated Mar. 4, 2014; U.S. Appl. No. 13/221,583, filed Aug. 30, 2011; 33 pages.
Final Office Action dated Feb. 28, 2014; U.S. Appl. No. 13/842,584, filed Mar. 15, 2013; 9 pages.
Canadian Office Action; Application No. 2,746,635; Jan. 14, 2014; 3 pages.
Japanese Office Action as Received in Co-pending Application No. 2011-540716 on Dec. 13, 2013; 3 pages. (No English translation available).
Chinese Office Action; Application No. 200980156929.0; Feb. 12, 2014; 13 pages.
Japanese Office Action as Received in Co-pending Application No. 2013-066527 on Jan. 23, 2014; 2 pages. (No English translation available).
Yu, Yi, et al.; U.S. Appl. No. 14/298,629, filed Jun. 6, 2014; Title: System and Method for Multi-User Multiplexing.
Notice of Allowance dated Mar. 17, 2014; U.S. Appl. No. 13/548,817, filed Jul. 13, 2012; 33 pages.
Office Action dated May 23, 2014; U.S. Appl. No. 13/716,839, filed Dec. 17, 2012; 76 pages.
Advisory Action dated Apr. 17, 2014; U.S. Appl. No. 13/842,584, filed Mar. 15, 2013; 2 pages.
Office Action dated May 16, 2014; U.S. Appl. No. 13/865,810, filed Apr. 18, 2013. 31 pages.
Chinese Office Action as Received in Co-pending Application No. 200980149651.4 on May 6, 2014; 3 pages. (No English translation available).
Canadian Office Action; Application No. 2,747,593; May 28, 2014; 4 pages.
Canadian Office Action; Application No. 2,747,339; May 6, 2014; 2 pages.
Chinese Office Action; Application No. 200980156892.1; Apr. 2, 2014; 20 pages.
Yu, Yi, et al.; U.S. Appl. No. 14/465,528, filed Aug. 21, 2014; Title: System and Method for Hybrid Automatic Repeat Request (HARQ) Functionality in a Relay Node; 33 pages.
Notice of Allowance dated Jun. 24, 2014; U.S. Appl. No. 12/331,992, filed Dec. 10, 2008; 10 pages.
Final Office Action dated Jul. 10, 2014; U.S. Appl. No. 13/221,583, filed Aug. 30, 2011; 19 pages.
Notice of Allowance dated Jun. 23, 2014; U.S. Appl. No. 13/716,839, filed Dec. 17, 2012; 10 pages.
Notice of Allowance dated Aug. 11, 2014; U.S. Appl. No. 13/842,584, filed Mar. 15, 2013; 30 pages.
Canadian Office Action; Application No. 2,747,349; Jun. 4, 2014; 3 pages.
Advisory Action dated Sep. 16, 2014; U.S. Appl. No. 13/221,583, filed Aug. 30, 2011; 18 pages.
Final Office Action dated Sep. 17, 2014; U.S. Appl. No. 13/865,810, filed Apr. 18, 2013; 42 pages.
Office Action dated Oct. 16, 2014; U.S. Appl. No. 13/865,810, filed Apr. 18, 2013; 38 pages.
Japanese Office Action as Received in Co-pending Application No. 2011-540716 on Aug. 22, 2014; 2 pages. (No English translation available).
Chinese Office Action; Application No. 200980156929.0; Sep. 2, 2014; 7 pages.
Canadian Office Action; Application No. 2,746,635; Jan. 22, 2015; 4 pages.
Chinese Office Action; Application No. 200980149651.4; Nov. 24, 2014; 12 pages.
Chinese Office Action; Application No. 200980149651.4; Aug. 23, 2013; 14 pages.
Japanese Office Action; Application No. 2011-542161; Aug. 29, 2013; 7 pages.
Chinese Office Action; Application No. 200980156928.6; Sep. 23, 2013; 15 pages.
Notice of Allowance dated Jul. 24, 2015; U.S. Appl. No. 13/865,810, filed Apr. 18, 2013; 14 pages.
Chinese Office Action; Application No. 200980149651.4; Jun. 5, 2015; 13 pages.
Womack, James Earl, et al.; U.S. Appl. No. 14/878,613, filed Oct. 8, 2015; Title: System and Method for Relay Node Selection; 27 pages.
Office Action dated Oct. 19, 2015; U.S. Appl. No. 14/298,629, filed Jun. 6, 2014; 89 pages.
Office Action dated Sep. 10, 2015; U.S. Appl. No. 14/465,528, filed Aug. 21, 2014; 8 pages.
European Examination Report; Application No. 09752588.5; Aug. 28, 2015; 7 pages.
3GPP TS 36.300 V8.6.0; 3rd Generation Partnership Project; Technical Specification Group Radio Access Network; Evolved Universal Terrestrial Radio Access (E-UTRA) and Evolved Universal Terrestrial Radio Access Network (E-TRAN); Overall Description; Stage 2; Release 8; Sep. 2008; 137 pages.
Final Office Action dated Mar. 23, 2015; U.S. Appl. No. 13/865,810, filed Apr. 18, 2013; 43 pages.
Advisory Action dated Jun. 12, 2015; U.S. Appl. No. 13/865,810, filed Apr. 18, 2013; 3 pages.
Canadian Office Action; Application No. 2,747,593; Mar. 26, 2015; 3 pages.
Final Office Action dated Mar. 24, 2016; U.S. Appl. No. 14/298,629, filed Jun. 6, 2014; 18 pages.
Notice of Allowance dated Feb. 24, 2016; U.S. Appl. No. 14/465,528, filed Aug. 21, 2014; 89 pages.
European Examination Report; Application No. 09789422.4; May 2, 2016; 7 pages.
Tao, Jeffrey Z., et al.; "Aggregation in 802.16j—Enhanced Concatenation and MPDU Construction"; IEEE C802.16j-06/178r2; Nov. 7, 2006; 18 pages.
Masato, Okuda, et al.; "MAC-PDU Reconstruction at RS"; IEEE C802.16j-07/022; Jan. 8, 2007; 3 pages.
Office Action dated Sep. 13, 2013; U.S. Appl. No. 13/548,817, filed Jul. 13, 2012; 37 pages.
Final Office Action dated Sep. 17, 2013; U.S. Appl. No. 13/216,819, filed Aug. 24, 2011; 22 pages.
Final Office Action dated Sep. 6, 2013; U.S. Appl. No. 13/221,583, filed Aug. 30, 2011; 23 pages.
Office Action dated Sep. 11, 2013; U.S. Appl. No. 13/842,584, filed Mar. 15, 2013; 55 pages.
Chinese Office Action; Application No. 200980156929.0; Aug. 1, 2013; 14 pages.
Chinese Office Action; Application No. 200980157135.6; Jul. 25, 2013; 13 pages.
Chinese Office Action; Application No. 200980156891.7; Jul. 19, 2013; 34 pages.
Japanese Office Action; Application No. 2011-542163; Jul. 18, 2013; 10 pages.
Chinese Office Action; Application No. 200980156931.8; Jul. 3, 2013; 28 pages.
Canadian Office Action; Application No. 2,747,349; Jul. 12, 2013; 3 pages.
Chinese Office Action; Application No. 200980156892.1; Jul. 23, 2013; 16 pages.
Japanese Office Action; Application No. 2011-542165; Jun. 20, 2013; 7 pages.
Canadian Office Action; Application No. 2,747,377; Aug. 19, 2013; 3 pages.
Advisory Action dated Jun. 1, 2016; U.S. Appl. No. 14/298,629, filed Jun. 6, 2014; 6 pages.

* cited by examiner

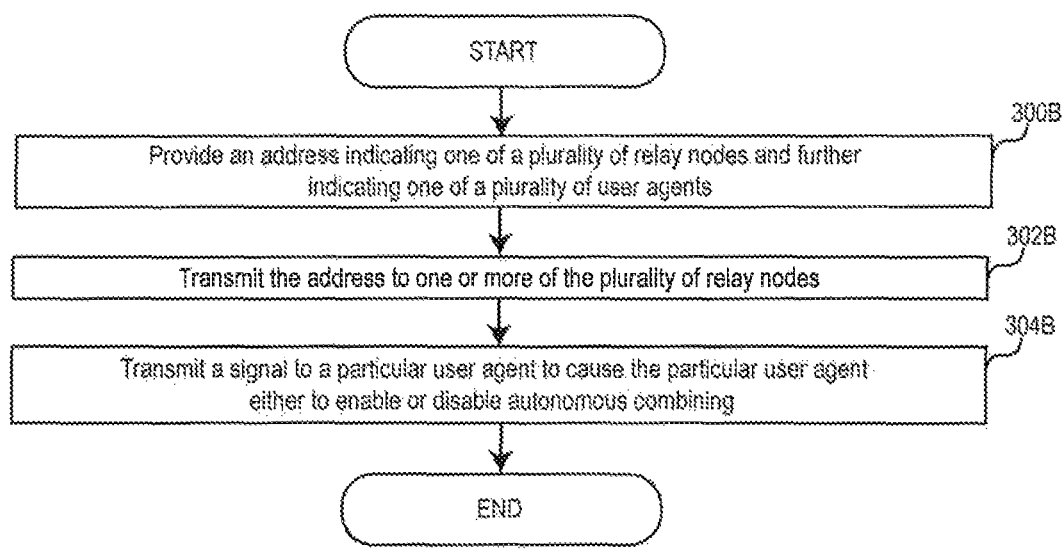

SYSTEM AND METHOD FOR AUTONOMOUS COMBINING

CROSS-REFERENCE TO RELATED APPLICATIONS

This is a divisional application of the prior filed and co-pending U.S. patent application Ser. No. 12/337,214 filed Dec. 17, 2008 by Zhijun Cai, et al. and entitled "System And Method For Autonomous Combining" which is incorporated herein by reference as if reproduced in its entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access node" may be used interchangeably, but it is understood that an access node may comprise a plurality of hardware and software.

The term "access node" does not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node to access other components in a wireless communications system. Additionally, two or more relay nodes may used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3B is a flowchart illustrating a method in an access node for facilitating autonomous combining in a user agent, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
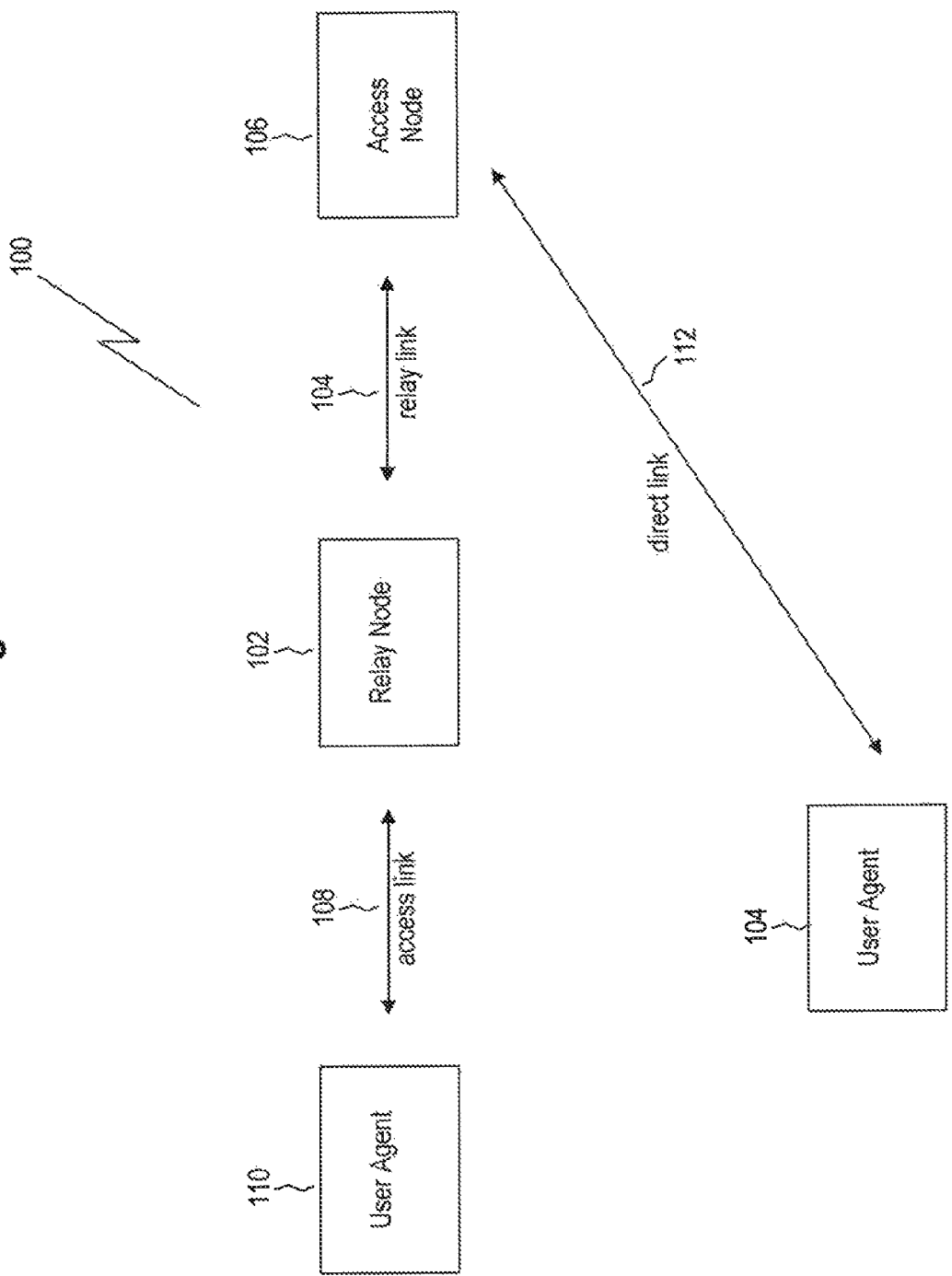
FIG. 1 is a diagram illustrating a wireless communication system that includes a relay node, according to an embodiment of the disclosure.

FIG. 1 is a diagram illustrating a wireless communication system 100 using a relay node 102, according to an embodiment of the disclosure. Generally, the present disclosure relates to the use of relay nodes in wireless communications networks. Examples of wireless communication networks include LTE or LTE-Advanced (LTE-A) networks, and all of the disclosed and claimed embodiments could be implemented in an LTE-A network. The relay node 102 can amplify or repeat a signal received from a UA 110 and cause the modified signal to be received at an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110. The relay node 102 might be placed near the edges of a cell so that the UA 110 can communicate with the relay node 102 rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within or near a cell, or to extend the size of coverage of a cell. Additionally, the use of a relay node 102 can enhance throughput of a signal within a cell because the UA 110 can access the relay node 102 at a higher data rate or a lower power transmission than the UA 110 might use when communicating directly with the access node 106 for that cell. Transmission at a higher data rate creates higher spectrum efficiency, and lower power benefits the UA 110 by consuming less battery power.

Relay nodes, generally, can be divided into three types: layer one relay nodes, layer two relay nodes, and layer three relay nodes. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node is distinguished from an access node by the fact that it requires the presence of at least one access node (and the cell associated with that access node) to access other components in a telecommunications system. The illustrative embodiments are primarily concerned with layer two or layer three relay nodes. Therefore, as used herein, the term "relay node" will not refer to layer one relay nodes, unless specifically stated otherwise.

In communication system 100, the links that allow wireless communication can be said to be of three distinct types. First, when the UA 110 is communicating with the access node 106 via the relay node 102, the communication link between the UA 110 and the relay node 102 is said to occur over an access link 108. Second, the communication between the relay node 102 and the access node 106 is said to occur over a relay link 104. Third, communication that passes directly between the UA 110 and the access node 106 without passing through the relay node 102 is said to occur over a direct link 112. The terms "access link," "relay link," and "direct link" are used in this document according to the meaning described by FIG. 1.

In wireless communications, any device capable of receiving wireless signals potentially could be configured to process a received wireless signal. For example, an access node transmits a first signal that contains first data. That first signal can be received by both a UA and a relay node to which the UA is connected. In turn, the relay node may generate and transmit a second signal to the UA that contains substantially similar data; however, the second signal may likely be transmitted using a different modulation and coding scheme relative to the first signal. The UA can thereby receive substantially the same data from both the first signal (from the access node) and then, a short time later, from the second signal (from the relay node). Although two different signals are actually used (one from the access node and one from the relay node), both signals may convey substantially the same data. Although the data from the access node and the relay node may be referred to as transmitting substantially the same data that is received by the UA, it will be appreciated that there may be some differences, and so the related data received by the UA in this instance may not be exactly the same.

Because the UA can receive substantially the same data from different signals transmitted by the access node and the relay node, before decoding the data, an opportunity arises to combine the demodulated data received from the two different signals or, possibly if the modulation and coding schemes of the two signals are substantially similar, to combine the signals before demodulating the data. By combining the data from the two signals, the UA can potentially improve data reception and thereby may allow the UA to better convey a service or otherwise improve performance.

Thus, the illustrative embodiments provide for a user agent capable of autonomous combining. The user agent can be implemented as a processor configured to promote receiving a first signal from an access node and a second signal from a relay node. The processor may be further configured to combine the first and second signals.

Figure 2:
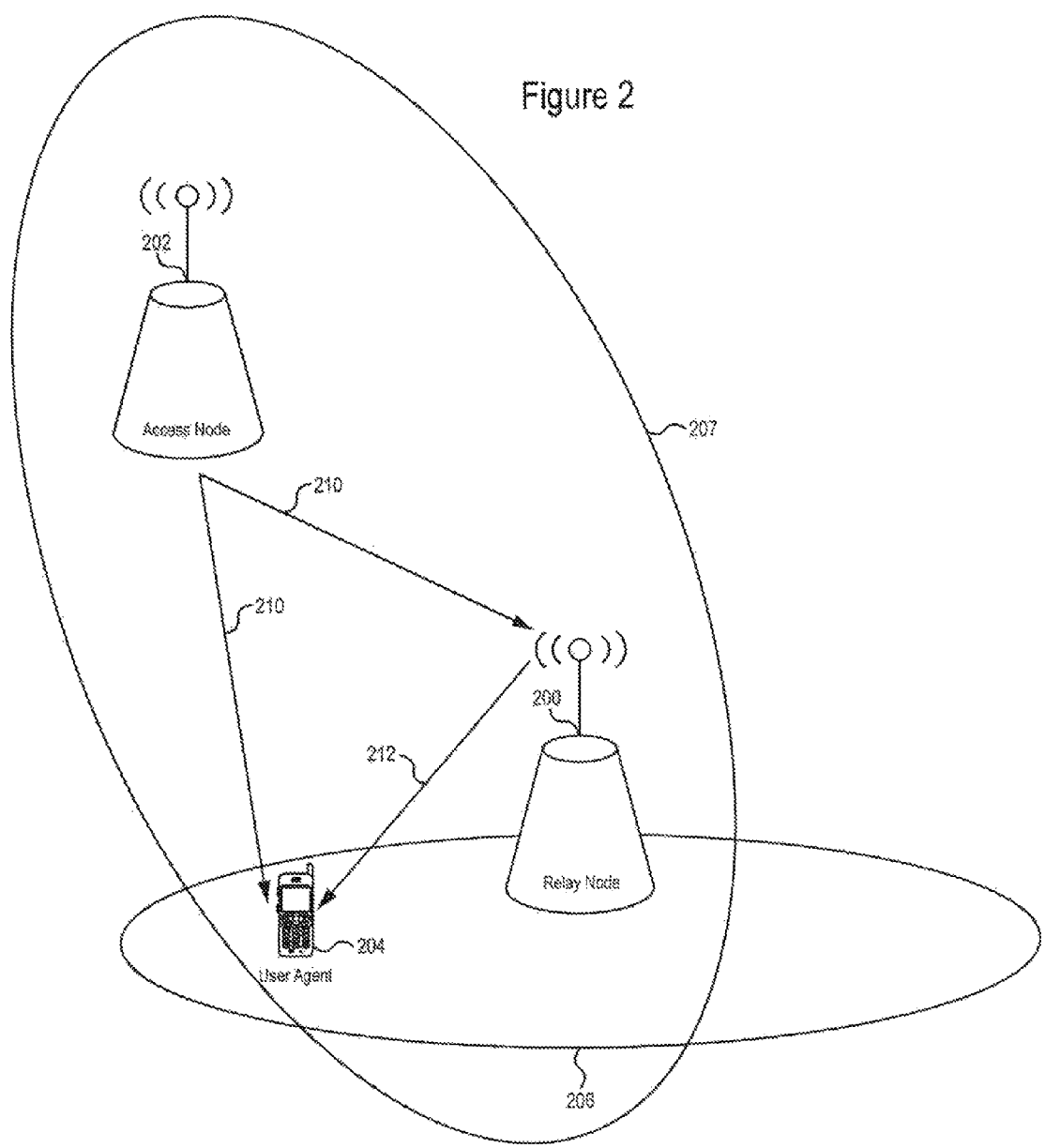
FIG. 2 is a block diagram of a relay node in communication with an access node and a user agent, according to an embodiment of the disclosure.

FIG. 2 is a block diagram of a relay node 200 in communication with an access node 202 and a UA 204, according to an embodiment of the disclosure. These devices are similar to, and operate in a manner similar to, corresponding devices in FIG. 1. Thus, for example, relay node 200 could be relay node 102 in FIG. 1, access node 202 could be access node 106 in FIG. 1, and UA 204 could be UA 110 in FIG. 1.

Relay node 200 operates within relay node cell 206. Likewise, access node 202 operates within access node cell 207. For purposes of the embodiments described herein, UA 204 is within the boundaries of both relay node cell 206 and access node cell 207. Likewise, relay node 200 is within access node cell 207. However, potentially, UA 204 could be within only one of relay node cell 206 or access node cell 207, or possibly within some other cell, and still receive service. For purposes of the embodiments described herein, the elliptical lines representing relay node cell 206 and access node cell 207 represent conceptual boundaries only, and do not necessarily represent the actual boundaries of these cells.

Because UA 204 is within relay node cell 206 and access node cell 207, UA 204 might receive signals from both relay node 200 and access node 202. Thus, due to propagation characteristics of wireless channels, substantially the same data could be transmitted to UA 204 by both relay node 200 and access node 202.

For example, access node 202 may send out a first signal that conveys data, as shown by both of arrows 210. The first signal is intended primarily for the relay node 200, but may be strong enough to be detected by the UA 204. Thus, arrows 210 show that, in one embodiment, the same signal (the first signal) is received by both relay node 200 and UA 204.

Thereafter, relay node 200 may relay or transmit a second signal (as shown by arrow 212) to UA 204. The second signal may convey substantially the same data contained in the first signal that had been transmitted from the access node 202. Thus, UA 204 receives the first signal (arrow 210) and a short time later receives the second signal (arrow 212), with both signals conveying substantially the same data.

The fact that UA 204 receives the same data from two different sources creates an opportunity for autonomous combining. In autonomous combining, the two different signals (via the relay link from the access node 202 and via the access link from the relay node 200) are demodulated at the UA 204, and the respective coded bits from each signal are combined. In this manner, the ultimate data decoded by UA 204 is more likely to accurately reflect the original data, such as was first transmitted from the access node 202. As a result, UA 204 can convey better service quality, or otherwise improve performance.

In another embodiment, the modulation and coding schemes of the two signals are substantially the same and the two different signals can be combined before demodulation. Alternatively, when the UA 204 receives a signal from the access link, the UA 204 will attempt to demodulate and decode the signal. If the reception is successful, the UA 204 may ignore the second signal. Otherwise, autonomous combining will proceed.

For example, during poor or varying channel conditions, the UA 204 may not be able to accurately demodulate and decode portions of first data conveyed along the relay link from the access node 202 to the UA 204. Likewise, second data conveyed along the access link (arrow 212) may be difficult to demodulate and decode for similar or other reasons. While in some instances the first data received via the relay link is supposed to be substantially the same as the second data received via the access link, the poor channel conditions may result in differences between the first data and the second data. However, if UA 204 demodulates and combines both the first and second signals, and then decodes, performance may be improved.

In different embodiments, combining data can be performed by a number of different methods. In one embodiment, incremental redundancy combining can be used. In incremental redundancy combining, coded bits are combined together based on the incremental redundancy parameter before the actual decoding. The incremental redundancy parameter is signaled to the UA 204 via the control channel. In another embodiment, blind decoding can be used. During blind decoding, the UA 204 demodulates and decodes signals as they arrive, without regard to coordinating signals. If the decoding is unsuccessful, and when a second signal bearing substantially similar data arrives, the UA 204 will attempt to combine the data before the decoding. However, little information is given to the UA 204 to perform the combining. This method may use more battery power in the UA 204. While the embodiments have disclosed two methods of combining, other methods of combining data could be used as well.

The modulation and coding scheme (MCS) of the signal on the access link (arrow 212) may be different than the MCS of the signal on the relay link (arrow 210). Thus, the UA may demodulate each signal and then combine the data, which may be channel encoded data received from each signal, as described above. In the event the MCS of the signals on both the access link and the relay link are the same or substantially similar, the two signals could be combined directly before demodulation in order to increase signal quality. The combined signal could then be decoded. Various other alternatives for combining the signals and/or data will readily suggest themselves and are within the scope of the present disclosure and claims.

The embodiments described above contemplate two, possibly more, signals being received: one on the access link, one on the relay link, and possibly more signals received from other relay nodes or access nodes. Thus, for example, signals received via multiple relay nodes and/or multiple access nodes could be received, decoded, with the resulting corresponding data streams being combined. However, if only one transmission is received, then the single transmission may still be considered successful.

Regarding acknowledgement/non-acknowledgement signals, because the UA 204 uses the access link (arrow 212) primarily for communication, the UA 204 only sends the ACK/NACK to the relay node 200. No ACK/NACK is sent from the UA 204 directly to the access node 202. For example, if the UA 204 decodes the combined data successfully, the UA 204 will send the ACK to the relay node. Accordingly, the relay node 202 may perform HARQ retransmissions. HARQ retransmissions could also be autonomously combined with signals from the relay link (arrow 210).

In a different embodiment, the UA 204 may receive a signal from the access node 202, wait for a short time, (represented by combined subframes) and then receive the same signal from the relay node 200. At that time or later, the UA 204 decodes the two signals and then combines the respective data contained in the two signals.

For example, the access node 202 sends a transport block to the relay node 200 in subframe "N." Both the UA 204 and the relay node 200 receive the subframe. No non-acknowledgement/acknowledgement (NACK/ACK) signal may be transmitted from the UA 204 to the access node 202; though a NACK/ACK signal is transmitted from the relay node 200 to the access node 202.

The UA 204 will attempt to decode the transmission from the access node 202. Decoding requires that the UA 204 monitor the physical downlink control channel (PDCCH) of the relay link. Optionally, the UA 204 can perform error correction. The relay node 200 schedules the received transport block for transmission to the UA 204 on subframe "N"+"M," wherein "M" is a relatively small number. The relay node 200 schedules the received transport block on the access link PDCCH in the same manner as the access node 202 did on the relay link. The UA may then wait for "M" subframes, more or less, to receive the transmission from the relay node 200. At that point, the UA may demodulate the separate signals and then implement autonomous combining of the resulting data, as described above.

In another embodiment, the access node 202 uses the identification (ID) of the UA 204 to deliver the scheduling grant to the relay node 200. The scheduling grant indicates to the relay node 200 that data for the UA 204 is being sent.

Because the access node 202 delivers the scheduling grant to the relay node 200 using the ID of the UA 204, the signal conveyed by the access link (arrow 212) and the relay link (arrow 210) can be identified for receipt by the UA 204. Further, additional data may be coded in a control channel (such as the PDCCH), with the additional data allowing a UA to know that the UA will receive substantially duplicate data over both the access link and the relay link. Thus, the UA 204 may anticipate reception of substantially duplicate data conveyed over coordinated signals. When the UA 204 receives the two signals, the UA 204 can perform autonomous combining, as described above. Accordingly, the scheduling grant by the access node 202 can be used to facilitate more efficient autonomous combining.

In still another embodiment, the access node 202 reserves a set of addresses for each relay node 200 in the cell serviced by access node 202. In one example, the access node 202 may divide the set of addresses into eight sets, one set for each of eight relay nodes. For each set, the first three bits of the cell radio network temporary identifier (C-RNTI) may be designated to each of the eight relay nodes in the cell of access node 202. Thus, each member of the set contains three bits to designate a corresponding relay node. For each member of the set of addresses, all bits following the first three bits may be used to provide identifiers for UAs. Thus, any given address identifier identifies the particular relay node and the particular UA.

In this manner, a given UA will know the identification of its relay node, as well as the identification of the UA itself. The combined identification could be used on both the access link and relay link. When a combined identification is used, UA 204 may know that it will receive substantially the same data from two different signals. When the two signals are received, UA 204 may demodulate those signals and thereafter combine the data, as provided above. This technique relieves the need for the relay node 200 to track identifications of UAs and may present a more flexible solution.

In still another embodiment, the access node 202 may promote the same medium access control packet data unit (MAC PDU) to be sent several times via the relay link (arrow 212) due to HARQ retransmission. Assuming incremental redundancy (IR) is used for the retransmission over the relay link, the UA 204 can also use incremental redundancy for combining the received data from both the relay link and the access link in order to obtain better reception. In this embodiment, the access node 202 may send a different redundancy version of the data over the relay link 210 as the relay node would send over the access link 212. The relay node 200 would successfully receive the MAC PDU, re-encode it and send a different IR version of the re-encoded MAC PDU. The relay node 200 would indicate the version number within the PDCCH scheduling grant to the UA 204. Additionally, the UA 204 could monitor for retransmissions from the access node 202 to the relay node 200 over the relay link 210. The UA 204 will know the version of the data from the redundancy version signaled in the PDCCH over the relay link 210.

In yet another embodiment, a new field may be added over the PDCCH signaling to identify the received MAC PDU index for appropriate autonomous combining. This new field on the PDCCH applies to both the relay link and the access link. The new field is used to identify the signals containing substantially the same data transmitted over the relay link or access link. For example, a 3 bit field is added to the PDCCH. When the access node 202 sends the first MAC PDU over the relay link to a relay node 200 using the UA's ID, this field is set to "000". Once the relay node forwards the same MAC PDU to the UA 204, the same value "000" is used in this field. Therefore, the UA 204 can use this field to identify the signal that potentially can be combined. The retransmissions of the same MAC PDU will have the same value "000," so the UA 204 can identify the potential signal for combining.

In other embodiments, an individual UA may disable or enable the use of autonomous combining. Alternatively, autonomous combining may be disabled for all UAs within a given cell. The latter case can be implemented by issuing a command from either relay node 200 or access node 202 to all UAs serviced by the corresponding device. In yet another illustrative embodiment, a UA may request that autonomous combining be disabled by either of relay node 200 or access node 202.

One reason to disable autonomous combining may be to save battery power in the UA. Another reason to disable autonomous combining is where the UA is in a location that has a poor reception from either one of the relay node 200 or access node 202, particularly if the access link (arrow 210) does not have good reception.

Some UAs in a cell may enable autonomous combining, while some may not. For UAs that enable the feature, the access node 202 may use UA identifications to deliver the scheduling grant, as well as other layer one information (such as MCS) to the relay nodes, so that a UA can detect the scheduling grant. For the UAs that do not enable autonomous combining, the access node 202 may still use a single relay node identification to deliver the scheduling grant.

In an embodiment, the UA 204 may either autonomously, or by command of the system, sample the direct link (arrow 210) to determine if there are any transmissions intended for the UA 204. To save battery power, the UA 204 might enable autonomous combining only if the UA 204 receives both direct link signals and relay link signals.

In another embodiment, an assumption is made that the PDCCH on the relay link (arrow 210) is sufficient for reception. However, this assumption may not always be valid. The UA 204 may attempt to receive the relay link PDCCH. If the UA 204 receives the relay link PDCCH, the UA 204 should attempt to decode the intended transmission. If the attempt fails, the UA 204 can stop trying to decode, thereby saving battery power. If the UA 204 cannot receive the PDCCH, the UA 204 may try again after a certain time. Due to possible improved signal reception, receipt of the PDCCH may be successful after the certain time.

A possible benefit to using autonomous combining is that both the block error rate (BLER) performance and spectrum efficiency can be improved. Another possible benefit is that data reception improves, resulting in improved quality of a desired service and/or other benefits.

Figure 3A:
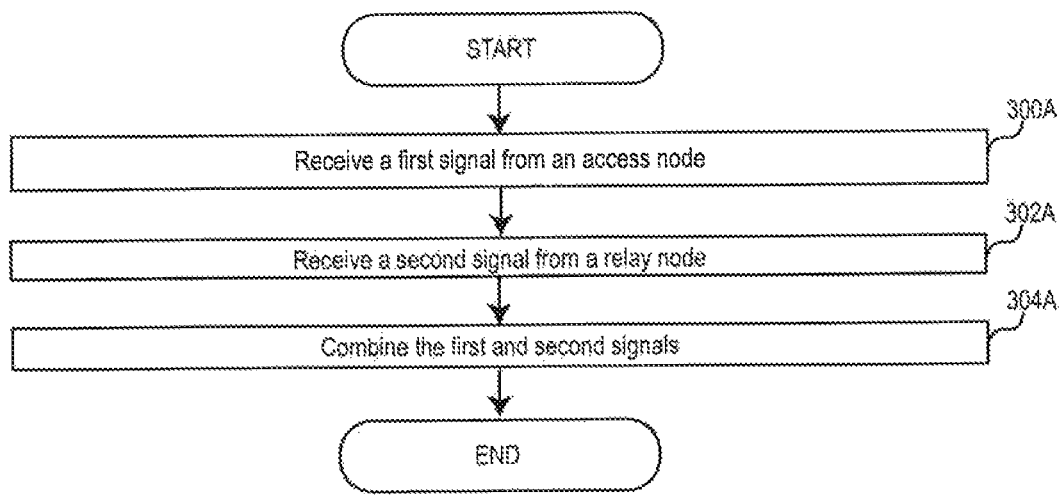
FIG. 3A is a flowchart illustrating a method of autonomous combining in a user agent, according to an embodiment of the disclosure.

FIG. 3A is a flowchart illustrating a method of autonomous combining in a UA, according to an embodiment of the disclosure. Examples of UAs in which the process shown in FIG. 3A can be implemented include UA 110 of FIG. 1 and UA 204 of FIG. 2.

The process begins as the UA receives a first signal from an access node (block 300A). The UA also receives a second signal from a relay node (block 302A). The UA then combines the first and second signals (block 304A). The process terminates thereafter.

In an embodiment, the first and second signals are further defined as first and second transmissions, respectively, containing a first and second data, respectively. In this case, combining the signals is further defined as demodulating portions of the first and second transmissions and combining the portions of the first and second data.

In another embodiment, the second transmission is received a first time after the first transmission. In this case, combining the first and second data occurs after the UA waits for a second time that is at least as long as the first time.

In yet another embodiment, combining is facilitated by the UA receiving additional data coded in a control channel. For example, the additional data could be a particular set of addresses from among a plurality of sets of addresses. The particular set of addresses includes a first subset of addresses that identify a corresponding relay node that can provide service for the UA. The particular set of addresses also may include a second subset of addresses that identify the UA.

In still another embodiment, the UA could be further configured to disable a function that allows the first and second data to be combined. The UA could disable the function responsive to a failure to receive the first transmission within a particular time. The UA could disable the function responsive to the first transmission having a weak strength relative to a desired signal strength. The UA could be further configured to re-enable the function responsive to the first transmission improving.

In another embodiment, the first and second data are combined using incremental redundancy combining. Alternatively, the first and second data are decoded using blind decoding.

FIG. 3B is a flowchart illustrating a method in an access node for facilitating autonomous combining in a UA, according to an embodiment of the disclosure. Examples of access nodes in which the process of FIG. 3B could be implemented include access node 106 of FIG. 1 and access node 202 of FIG. 2.

The process begins as the access node provides an address indicating one of a plurality of relay nodes and further indicating one of a plurality of UAs (block 300B). The access node transmits the address to one or more of the plurality of relay nodes (block 302B). The access node then transmits a signal to a particular UA to cause the particular UA to either enable or disable autonomous combining (block 304B). The process terminates thereafter.

In an embodiment, the address comprises a first set of bits and a second set of bits. The first set of bits identifies a corresponding relay node and the second set of bits identifies a corresponding UA within a donor cell of the corresponding relay node.

Figure 4:
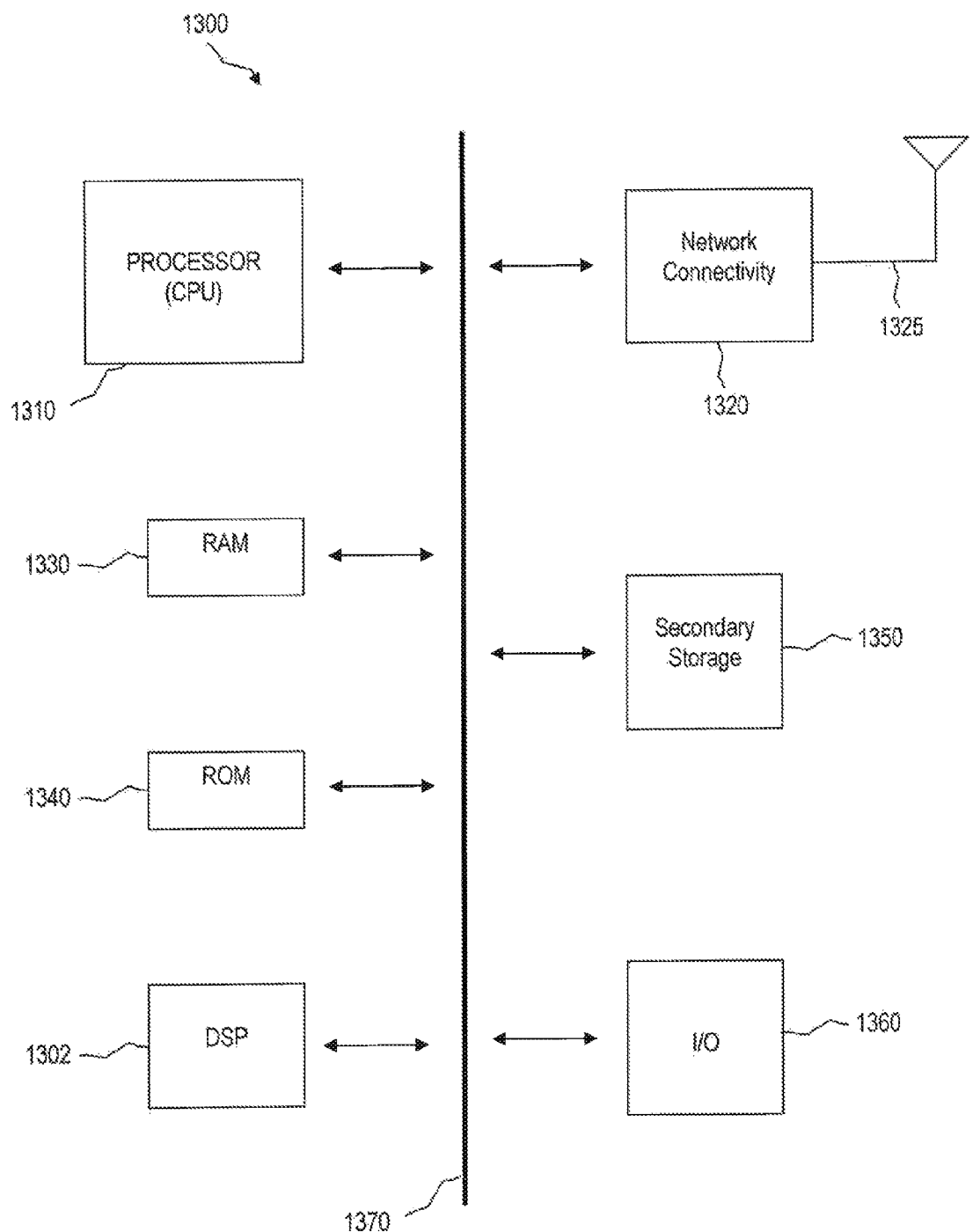
FIG. 4 illustrates a processor and related components suitable for implementing the several embodiments of the present disclosure.

The UA 110 and other components described above might include a processing component that is capable of executing instructions related to the actions described above. FIG. 4 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1302. Although the DSP 1302 is shown as a separate component, the DSP 1302 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

The following are incorporated herein by reference for all purposes: 3rd Generation Partnership Project (3GPP) Technical Specification (TS) 36.813 and 3GPP TS 36.814.

Thus, the illustrative embodiments provide for a user agent capable of autonomous combining. The user agent can be implemented as a processor configured to promote receiving a first signal from an access node and a second signal from a relay node. The processor may be further configured to combine the first and second signals.

The illustrative embodiments further provide for a method implemented in a user agent. A first signal is received from an access node. A second signal is received from a relay node. The first and second signals are combined.

The illustrative embodiments further provide for an access node. The access node is configured to reserve ones of sets of addresses for corresponding ones of a plurality of relay nodes. Ones of the set of addresses comprise a corresponding first set of bits and a corresponding second set of bits. A particular first set of bits identifies a particular relay node. A particular second set of bits identifies a particular UA within a donor cell of the particular relay node. The access node is further configured to transmit the ones of sets of addresses to the plurality of relay nodes.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An access node comprising:
a transmitter;
a storage device; and
a processor configured to execute instructions stored on the storage device such that when executed, cause the transmitter to:
transmit an indication corresponding to one of a plurality of relay nodes to a user agent;
transmit a first transmission to the user agent, the first transmission containing a first data; and
transmit an instruction to the user agent to instruct the user agent to enable combining, wherein the user agents separately demodulates portions of the first transmission and a second transmission containing a second data from the one of a plurality of relay nodes and combines portions of the first and second data.

2. The access node of claim 1, wherein the indication comprises an address including a first set of bits and a second set of bits, wherein the first set of bits identifies the corresponding relay node and wherein the second set of bits identifies an address corresponding to the user agent.

3. The access node of claim 1, wherein the processor is further configured to execute instructions stored on the storage device such that when executed, cause the transmitter to:
transmit a signal to a particular user agent to instruct the particular user agent to disable autonomous combining.

4. The access node of claim 3, wherein the processor is further configured to execute instructions stored on the storage device such that when executed, cause the transmitter to:
transmit another signal to the particular user agent to instruct the particular user agent to re-enable autonomous combining to improve data reception from the access node.

5. The access node of claim 1, wherein the access node is configured to:
add a field to a physical downlink control channel (PDCCH) signal, wherein the field includes an index to identify a medium access control packet data unit (MAC PDU) at the user agent.

6. A method implemented in an access node, the method comprising:
transmitting an indication corresponding to one of a plurality of relay nodes to a user agent;
transmitting a first transmission to the user agent, the first transmission containing a first data; and
transmitting an instruction to the user agent to instruct the user agent to enable combining, wherein the user agents separately demodulates portions of the first transmission and a second transmission containing a second data from the one of a plurality of relay nodes and combines portions of the first and second data.

7. The method of claim 6, wherein the indication comprises an address including a first set of bits and a second set of bits, wherein the first set of bits identifies the corresponding relay node and wherein the second set of bits identifies a corresponding user agent within a donor cell of the corresponding relay node.

8. The method of claim 6, further comprising:
transmitting a signal to a particular user agent to instruct the particular user agent to disable autonomous combining.

9. The method of claim 8, further comprising:
transmitting another signal to the particular user agent to instruct the particular user agent to re-enable autonomous combining to improve data reception from the access node.

10. The method of claim 6, further comprising:
adding a field to a physical downlink control channel (PDCCH) signal, wherein the field includes an index to identify a medium access control packet data unit (MAC PDU) at the user agent.

11. A non-transitory computer readable medium storing instructions executable by a processor to implement a method in an access node, the method comprising:
transmitting an indication corresponding to one of a plurality of relay nodes to a user agent;
transmitting a first transmission to the user agent, the first transmission containing a first data; and
transmitting an instruction to the user agent to instruct the user agent to enable combining, wherein the user agents separately demodulates portions of the first transmission and a second transmission containing a second data from the one of a plurality of relay nodes and combines portions of the first and second data.

12. The non-transitory computer readable medium of claim 11, wherein the indication comprises an address including a first set of bits and a second set of bits, wherein the first set of bits identifies the corresponding relay node and wherein the second set of bits identifies a corresponding user agent within a donor cell of the corresponding relay node.

13. The computer readable medium of claim 11, the method further comprising:
transmitting a signal to a particular user agent to instruct the particular user agent to disable autonomous combining.

14. The non-transitory computer readable medium of claim 13, the method further comprising:
transmitting another signal to the particular user agent to instruct the particular user agent to re-enable autonomous combining to improve data reception from the access node.

15. The non-transitory computer readable medium of claim 11, the method further comprising:
adding a field to a physical downlink control channel (PDCCH) signal, wherein the field includes an index to identify a medium access control packet data unit (MAC PDU) at the user agent.

* * * * *